April 12, 1960 A. J. SARKA Re. 24,807

FLYING CUTTER FOR STRIP MATERIAL

Original Filed Dec. 9. 1954 5 Sheets-Sheet 1

INVENTOR

Albert J. Sarka

By Hoyer, Leonard & Ball his attorneys

April 12, 1960 A. J. SARKA Re. 24,807
FLYING CUTTER FOR STRIP MATERIAL
Original Filed Dec. 9, 1954 5 Sheets-Sheet 2
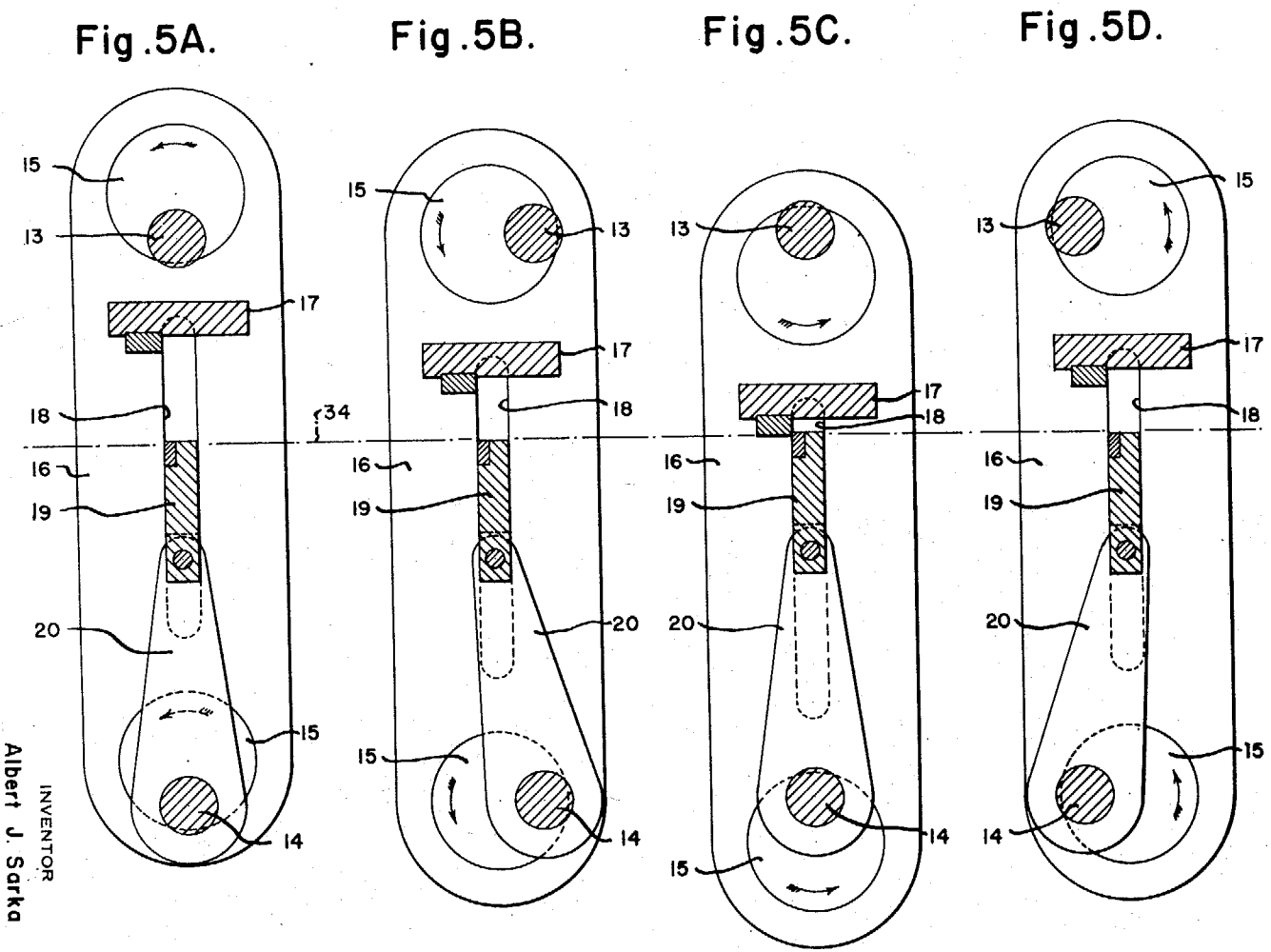
INVENTOR
Albert J. Sarka
by Hoopes, Leonard & Buell
his attorneys

FLYING CUTTER FOR STRIP MATERIAL

Original Filed Dec. 9, 1954 5 Sheets-Sheet 3

INVENTOR

Albert J. Sarka

By Hayes, Leonard & Buell
his attorneys

FLYING CUTTER FOR STRIP MATERIAL

Original Filed Dec. 9, 1954 5 Sheets-Sheet 4

INVENTOR
Albert J. Sarka
By Hoyes, Fleming & Bell
his attorneys

April 12, 1960 A. J. SARKA Re. 24,807
FLYING CUTTER FOR STRIP MATERIAL
Original Filed Dec. 9, 1954 5 Sheets-Sheet 5
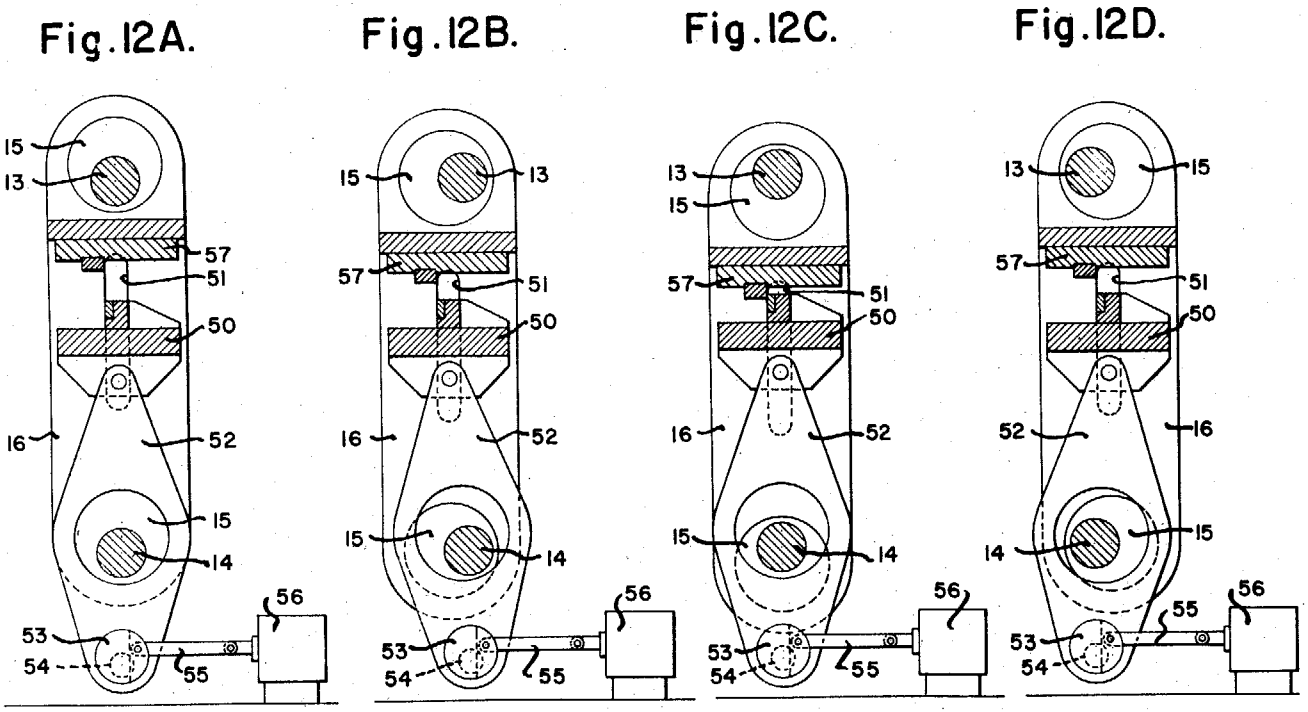
INVENTOR
Albert J. Sarka
Hoopes, Leonard & Knell
his attorneys United States Patent Office Re. 24,807
Reissued Apr. 12, 1960

24,807

FLYING CUTTER FOR STRIP MATERIAL

Albert J. Sarka, Maple Heights, Ohio, assignor to Wean Equipment Corporation, Cleveland, Ohio, a corporation of Ohio Original No. 2,827,962, dated March 25, 1958, Serial No. 474,234, December 9, 1954. Application for reissue July 28, 1958, Serial No. 755,826.

17 Claims. (Cl. 83—324)

Matter enclosed in heavy brackets [ ] appears in the original patent but forms no part of this reissue specification; matter printed in italics indicates the additions made by reissue.

This invention relates to apparatus for treating strip and the like and more particularly to apparatus for treating moving material in strip-like form without interrupting the movement of the material. For purposes of explanation and illustration the invention will be described as embodied in three forms of flying shear.

One of the great problems in high speed strip production is the treatment of the strip, e.g., to cut it into lengths, to stamp indicia upon it or to otherwise treat the strip, as it is being processed at high speeds. Conventional methods of treating strip are unsatisfactory for treating high speed strip since the strip piles up at the treating machine, is torn or otherwise damaged or the spacing is inaccurate. Many types of so-called "flying shears" and like devices have heretofore been proposed for treating such moving strip, but in every case these devices are subject to the disadvantages of complexity of design, high cost, large floor space requirements, need for highly skilled operating personnel and above all, very definite limitations as to accuracy and operating speed.

The strip treating mechanism of this invention eliminates all of these disadvantages of the prior art equipment. The mechanism of this invention is simple in construction and design, economical of floor space and is virtually unlimited in operating speeds. It may be positively synchronized with the strip speed and is free from piling up of the strip, tearing and other damaging effects which are associated with conventional mechanisms. The mechanism of the invention may be used for shearing, contour cutting, stamping or otherwise treating a rapidly moving strip. The mechanism shall, however, be specifically described in this application in connection with shearing of metal strip.

Preferably there is provided continuously operable means feeding strip material, and the like in a path, a first member for acting on the strip and the like mounted to operate in a circular path a portion of which lies substantially in the first mentioned path, a guide extending generally transversely of the first mentioned path mounted to move with the first member, a second member for acting on the strip and the like mounted to reciprocate in the guide and move generally in the direction of the first mentioned path generally in unison with the first member and to move substantially into the first mentioned path substantially simultaneously with the first member. Preferably the first member is mounted in a floating frame surrounding the path of strip travel and mounted on spaced apart eccentric cams. These cams are identical in size and shape and rotate about parallel axes and in the same direction so that all points on the frame describe a circle of identical size during each revolution of the cams. The second member is preferably mounted in guides in the frame on the side of the strip opposite the first member and pivoted to an arm which is in turn pivoted about a fixed axis opposite the first member so that the second member is caused to reciprocate in the guide ways as the frame carrying the first member revolves about its cams.

Means may be provided for altering the fixed axis of the arms carrying the second member so that the axis is lowered and the second member dropped out of contact with the first member for one or a multiplicity of rotations of the cam. This means may be a rotatable eccentric cam upon which the arm pivots and means for rotating the cam to raise and lower the pivotal axis of the arm. Preferably this rotating means is a solenoid but it may be an air cylinder or similar actuating means or combination thereof.

Means may also be provided for altering the length of strip cut or treated. This may be accomplished through means for altering the speed of strip feed so as to vary the cut lengths when the invention is used as a shearing device. This means preferably takes the form of a variable speed drive such as a PIV unit between the driving means and the pinch roll drive gears. It is necessary that the velocity of the upper platen carrying frame be synchronized with the speed of the strip at the time the platens contact the strip when the strip speed is thus altered. This synchronization is accomplished by means of variable throw eccentric cams which can be adjusted to vary the circumference of the circle generated by any point on the first member carrying frame. The circumference of this circle must equal the length of material fed by the pinch rolls for one cycle of operation.

Means may also be provided for interchanging platens so that the shear may be converted to a punch press, a stamping machine or other strip treating mechanism simply by changing the platens. Preferably this is accomplished by providing platen holders, one fixed in the floating frame and the other pivoted on the arm and vertically reciprocable in the frame.

Certain features, objects and advantages of this invention have been described above. Other features, objects and advantages will be apparent from a consideration of the following description and the accompanying drawings in which:

Figures 5A, 5B, 5C and 5D are vertical sectional views through the floating frame and illustrate diagrammatically the sequence of motion of the floating frame and platens during a single cycle;

Figures 12A, 12B, 12C and 12D are vertical sectional views of the same shear appearing in Figures 11A, 11B and 11C but with the shear in cutting position by raising the pivotal axis of the lower platen arms.

Figure 1:
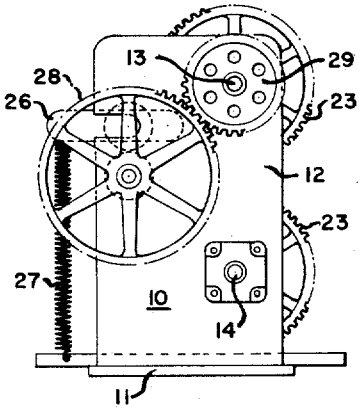
Figure 1 is a side elevational view of a flying shear according to this invention.
Figure 2:
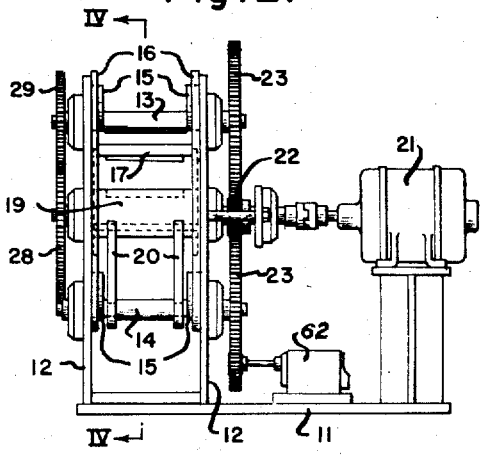
Figure 2 is an elevation view of the discharge end of the flying shear of Figure 1.
Figure 3:
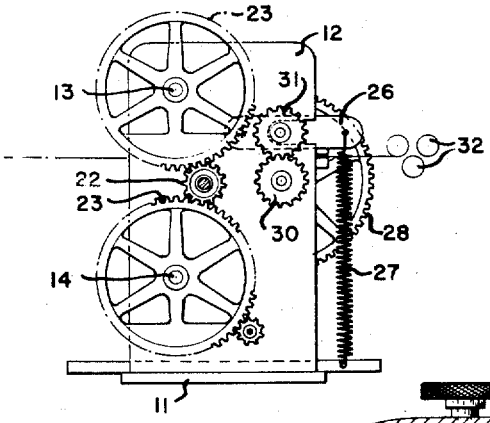
Figure 3 is a side elevation view of the shear of Figure 1 looking from the right of Figure 2.
Figure 4:
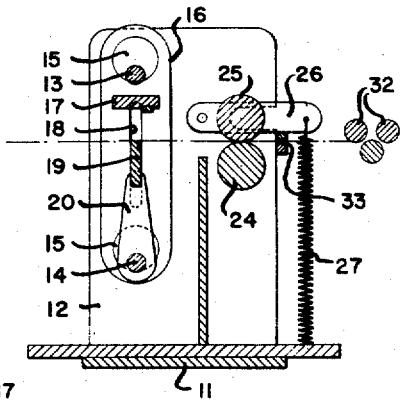
Figure 4 is a vertical section on the line IV—IV of Figure 2.

Referring to the drawings there is illustrated a housing 10 having a base 11 and side members 12. A pair of parallel shafts 13 and 14 are journaled for rotation adjacent the top and bottom of the side members 12, vertically one above the other. Each of these shafts is provided with eccentric cams 15 adjacent the side members 12. A floating frame made up of side frames 16 mounted for rotation on the cams 15 and spacer members (not shown) is provided between the side members 12 of the housing. A top platen 17 is fixed between the side frames 16 below the upper shaft 13 and travels with these side frames. Each side frame 16 is provided with a vertical slot 18 within which a lower platen 19 is vertically reciprocable. The lower plate 19 is pivotally mounted on the end of vertical arms 20 which are in turn pivoted on the lower shaft 14 alongside the eccentric cams 15.

The two shafts 13 and 14 are driven by a motor 21 acting through a drive pinion 22 and identical gears 23 on the shafts 13 and 14.

A pair of pinch rolls 24 and 25 are provided adjacent the floating frame. The lower pinch roll 24 is journaled in the side members 12. The upper pinch roll 25 is journaled in lever arms 26 pivotally mounted on the side members 12 above the bottom pinch roll. Tension springs 27 are connected to the ends of these lever arms 26 to maintain pressure between the rolls. The lower pinch roll 24 is driven from a gear 28 mounted at one end thereof which gear is in turn driven by a gear 29 on the end of the upper shaft 13. The gears 28 and 29 are matched to give a peripheral speed on the pinch roll 24 equal to the peripheral speed of the cams 15. The opposite end of the pinch roll 24 is provided with a gear 30 which drives the upper pinch roll 25 through an identical gear 31. A set of rollers 32 may be provided in the form of a roller leveler in advance of the pinch rolls to level the strip and a strip guide slot 33 may be inserted between the roller leveler and pinch rolls to align the strip with the roll nip.

The operation of the flying shear described above will be perhaps best explained by reference to the diagrammatic showing of Figures 5A through 5D. The strip 34 to be sheared passes through the roller leveler 32 and the guide slot 33 into the pinch rolls 24 and 25. The strip is then fed by the pinch rolls at a steady rate of speed through between the side frames 16 of the floating frame and between the upper platen 17 and lower platen 19. As the motor 21 drives the shafts 13 and 14 the eccentric cams carry the side frames 16 of the floating frame in a circle about the two shafts as illustrated in Figures 5A through 5D. This in turn carries the upper platen through an identical circle below the shaft 13. At the time the lower platen 19 is moved vertically reciprocably in the slot 18 and at the same time back and forth horizontally with the floating frame, thereby following an arcuate path. As the strip is fed out of the pinch rolls at a steady rate of speed the upper platen 17 and lower platen 19 follow the positions illustrated in Figures 5A through 5D so that they momentarily intersect at 5C to make a cut. Since the linear speed of the pinch rolls and the cam surface is the same, then the linear speed of the strip and the platens will be the same and the speed of the strip relative to the speed of the blades will be zero at the moment of contact. Therefore, the strip can be sheared or otherwise processed by appropriate tooling mounted on the platens just as effectively as if the operation were performed in a stationary manner.

Figure 11A:
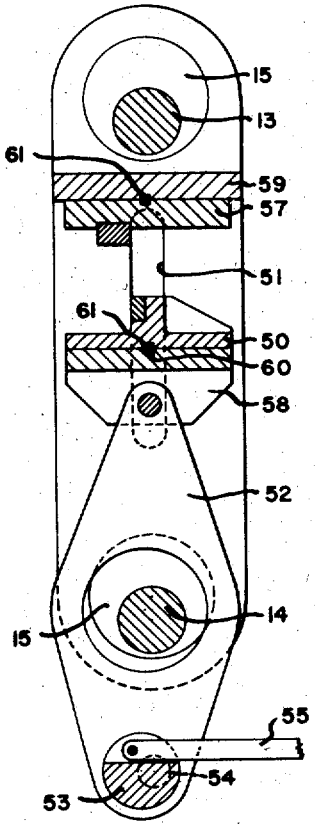
Figures 11A, 11B and 11C are vertical sectional views through the floating frame of a shear according to this invention illustrating a miscut by lowering the pivotal axis of the lower platen arms.
Figure 11B:
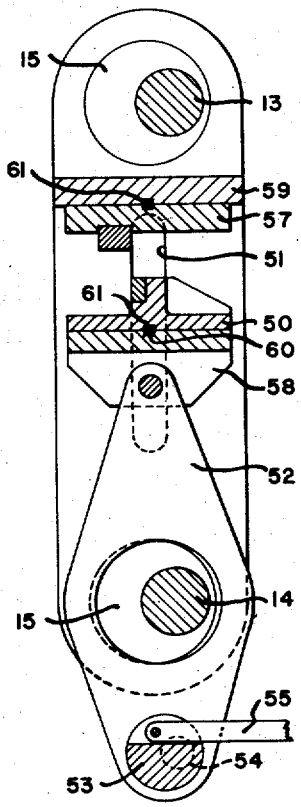
Figure 11C:
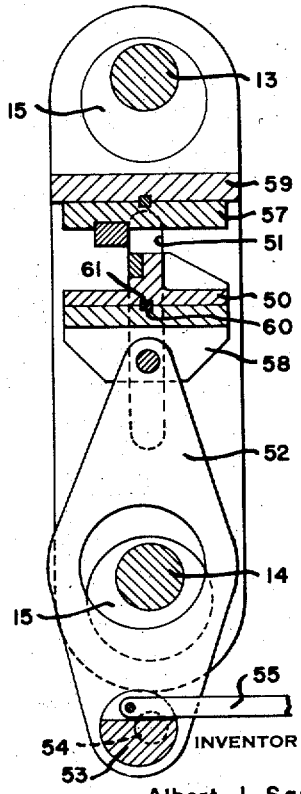

In the shear structure described above, a cut can be made consistently to a given length. In order to permit variation in length of multiples of the basic length, a modified form of structure may be used. In this modification, the drive, the housing, the eccentric cams and the floating frame structure remain the same. The lower platen 50 is still reciprocable in slots 51 identical with those of Figures 1 through 5. However, the lower platen 50 is pivoted on the ends of arms 52 which surround the lower shaft 14 out of contact with it. The arms 52 are pivoted on eccentric cams 53 mounted on a separate shaft 54. The eccentric cams are connected through a shaft 55 to a double acting solenoid 56 which acts to rotate them about the shaft 54 and thereby raise and lower the pivotal axis of the arms 52. By lowering the pivotal axis of the arms 52 the lower platen is caused to follow an arc slightly below the path of travel of the strip so that its travel never intersects the path of the upper platen 57. This is illustrated in Figures 11A through 11C. When the pivotal axis of the arms 52 is raised the operation of the two platens is as described in connection with Figures 5A through 5D. This action is specifically illustrated in Figures 12A through 12D. Actuation of the solenoid may be made by means of an adjustable counter 62 geared into the drive and adjusted so that the solenoid can complete a stroke in each direction every second, third, fourth or other desirable cycle of the machine.

In order to permit the ready interchange of platens 50, a lower platen holder 58 may be provided for reciprocation in the slots 51 to carry the platen 50. Also, an upper platen holder 59 may be provided to carry the platen 57. The platen holders 58 and 59 may be provided with keyways 60 to receive a key 61. By using platen holders, various interchangeable platens such as punches, dies, stamps and the like may be substituted for the cutting platens 50 and 57 as shown in the drawings.

In the modification shown in Figures 11A through 11C and 12A through 12D means are provided for cutting multiple lengths of a basic length. It may be desirable, however, to vary the basic length without varying it by a multiple thereof. In order to accomplish this means are provided for varying the throw of the cams actuating the upper platen carrier housing so that the circumference of the circle generated by any point in the housing is equal to the length of cut it is desired to establish. Means are also provided for adjusting the speed of the pinch rolls so that this same length of material is fed during one cycle. An infinitely adjustable variable speed drive 70 may be driven by a gear 71 on the lower shaft 72 of a flying shear similar to that of Figures 1 through 5. In the embodiment illustrated in Figures 6 and 7 the shaft 72 is the equivalent of shaft 14. A lower pinch roll 73, corresponding to pinch roll 24, is driven by the variable speed drive 70 through gears 74 and 75. The upper pinch roll 73a is driven by gears 76 and 77 corresponding to gears 30 and 31 of Figures 1 through 5. By varying the variable speed drive 70 the amount of strip fed by the pinch rolls 73 and 73a for each cycle of the floating frame can be varied so as to make it less than the basic length of cut.

Figure 10:
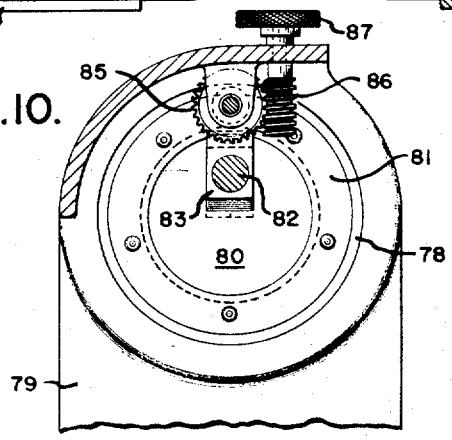
Figure 10 is a sectional view taken along line X—X of Figure 8.
Figure 8:
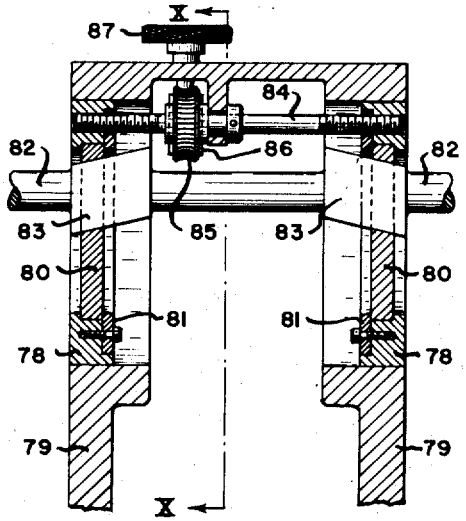
Figure 8 is a section taken along line VIII—VIII of Figure 6 and showing the variable cam arrangement in the maximum position.
Figure 9:
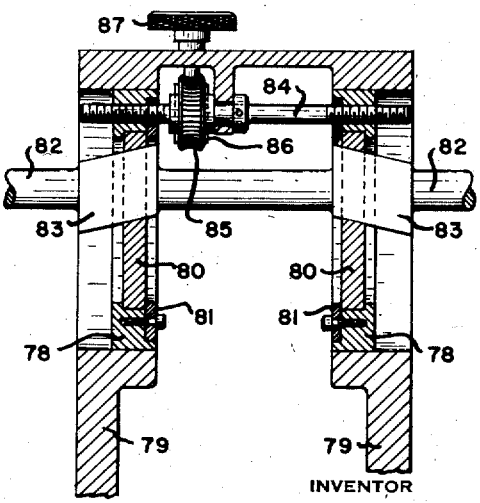
Figure 9 is the same as Figure 8 except that the variable cam arrangement is in the minimum position.

Means for varying the eccentricity of the driving cams is shown in Figures 8, 9 and 10. Annular rings 78 correspond to the eccentric cams 15 and are fitted in the side frames 79 corresponding to the side frames 16. Eccentric cams 80 fitted with rectangular slots are mounted in the rings 78 and held in place with the retainers 81. The drive shaft 82 (corresponding to shaft 13) is fitted with to rectangular sloping ways 83 which fit the rectangular slots in the cams 80. The shaft 84 is threaded with a right hand thread on one side and a left hand thread on the other side to cooperate with corresponding threads in the rings 78. A worm gear 85 is rigidly attached to the shaft 84. A worm 86 is mounted so as to cooperate with the worm gear 85. By turning the hand wheel 87, the worm 86 causes the worm gear 85 to rotate thus rotating shaft 84. This rotation causes the cams 80 to slide on the sloping ways 83 thus altering the amount of eccentricity. It is only necessary that the eccentricity of the upper and lower sets of cams be equal to each other and that the circumference of the circle generated by this throw be equal to the length of material fed by the pinch rolls as determined by the adjustment of the variable speed drive 70.

Figure 6:
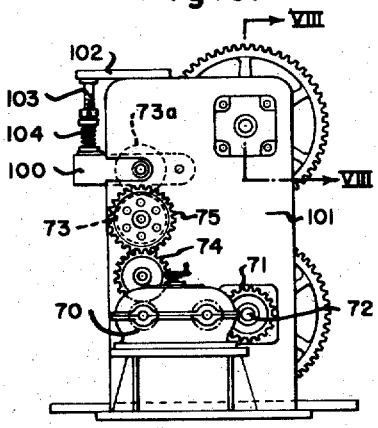
Figure 6 is a side elevational view of a flying shear according to this invention incorporating a variable drive to the pinch rolls and a variable cam arrangement for varying the throw of the floating housing. This figure also shows a modified pinch roll tensioning mechanism.
Figure 7:
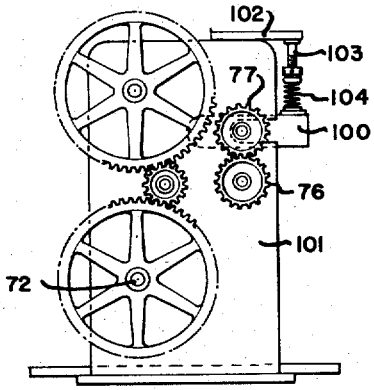
Figure 7 is a side elevation of the shear shown in Figure 6 taken from the opposite side.

In the embodiment shown in Figures 6 and 7 an alternative form of mechanism for applying pressure to the pinch rolls is shown. In this embodiment the upper pinch roll is journaled in lever arms 100 pivoted on the housing 101. An outwardly extending arm 102 fixed to the housing 101 projects above and parallel to the lever arm 100. Suspended from the arm 102 is a screw jack 103 bearing against a spring 104 in turn bearing on the free end of lever arm 100. By adjusting the position of the screw jack 103, the pressure on the lever arm 100 may be varied by varying the compression on the spring 104.

Figure 13A:
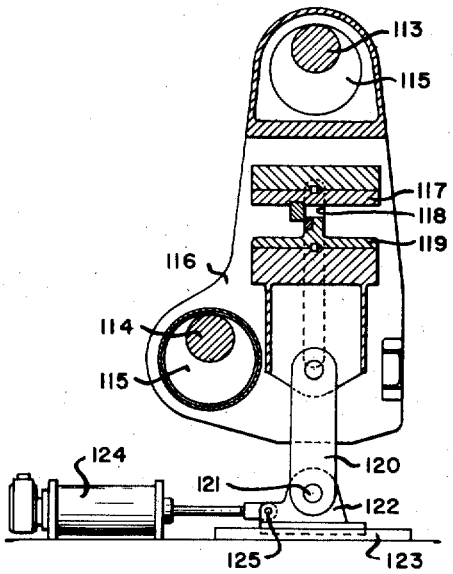
Figures 13A and 13B are side elevational views of a flying shear according to this invention embodying eccentric cams for the floating frame which lie in two spaced apart vertical planes.
Figure 13B:
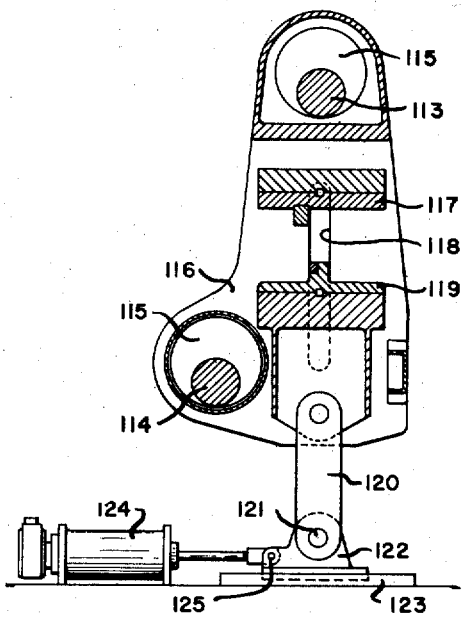

In the embodiment illustrated in Figures 13A and 13B, there is illustrated a flying shear having a pair of shafts 113 and 114 corresponding to the shafts 13 and 14 of Figures 1 through 5. These shafts 113 and 114 are journaled in two spaced apart parallel vertical planes instead of in the same vertical plane as are shafts 13 and 14 in Figures 1 through 5. Each of the shafts 113 and 114 are provided with eccentric cams 115 which carry side frames 116 of a floating frame. The side frames 116 are preferably in the form of a triangle journaled on the cams 115 adjacent to apexes. An upper platen 117 is fixed between the side frames and rotates with them. Directly beneath the upper platen 117 are guide slots 118 carrying a lower platen 119 mounted on the ends of arms 120 journaled on pins 121 located in slide blocks 122. The slide block 122 are mounted on longitudinal ways 123. Air cylinders 124 are connected by pins 125 to slide blocks 122. Movement of slide blocks 122 to the right by means of air cylinders 124 lowers the platen 119 out of operating position. The operation of this embodiment is precisely the same as that of the embodiment illustrated in Figures 1 through 5.

While certain preferred embodiments of this invention have been illustrated and described it will be understood that the invention may be otherwise embodied within the scope of the following claims.

I claim:

1. Apparatus for treating rapidly moving strip and the like comprising continuously operable means feeding strip and the like in a path, a first member for acting on the strip and the like mounted to operate in a circular path a portion of which lies substantially in the first mentioned path, a guide extending generally transversely of the first mentioned path mounted to move with the first member, a second member for acting on the strip and the like mounted to reciprocate in the guide and link means connecting the second member to a pivot point spaced from and independent of the first member causing the second member to reciprocate in the guide and move generally reciprocably in the direction of the first mentioned path generally in unison with the first member and to move substantially into the first mentioned path substantially simultaneously with the first member.

2. Apparatus for treating rapidly moving strip and the like comprising continuously operable means feeding strip or the like, a first member for acting on the strip or the like mounted to operate in a circular path a portion of which lies substantially in the first mentioned path, eccentric drive means actuating said first member to operate in said circular path, a guide extending generally transversely of the first mentioned path mounted to move with the first member, a second member for acting on the strip or the like mounted to reciprocate in the guide and link means connecting the second member to a pivot point spaced from and independent of the first member causing the second member to reciprocate in the guide and move generally reciprocably in the direction of the first mentioned path generally in unison with the first member and to move substantially into the first mentioned path substantially simultaneously with the first member.

3. Apparatus for treating rapidly moving strip and the like comprising continuously operable means feeding strip and the like, an eccentrically driven floating frame surrounding the path of travel on the exit side of the feeding means all points of which frame move in a circular path, a first member for acting on the strip or the like, said first member being on said frame on one side of the path of strip travel and adapted to pass on the first mentioned path during a portion of its movement with the frame, a second member for acting on the strip reciprocably movable in said frame transverse to the path of travel of the strip and link means connecting the second member to a pivot point spaced from and independent of the first member causing the second member to reciprocate in the frame and move generally reciprocably in the direction of the first mentioned path generally in unison with the first member and to move substantially into the first mentioned path substantially simultaneously with the first member.

4. Apparatus for treating moving strip or the like comprising continuously operable means feeding strip or the like in a path, an eccentrically driven floating frame surrounding the path of strip travel on the exit end of the feeding means all points of which frame move in a circle whose radius equals the throw of the eccentrics, a first member on said frame on one side of the path of strip travel, guideways on the floating frame spaced from the first member on the opposite side of the first mentioned path and transverse thereto, a second member reciprocally movable in said guideways, a pair of spaced arms pivoted on the second member and on an axis spaced from and independent of the first member on the opposite side of the guideways whereby the second member reciprocably follows a path generally parallel to the path of strip travel, and drive means driving the strip feed means and the floating frame in unison.

5. Apparatus for treating rapidly moving strip and the like as claimed in claim 4 wherein the arms are pivotally mounted on eccentric cams and means are provided for rotating said eccentric cams within the arms to vary their pivotal axis whereby the second member is moved into and out of position to intersect the path of strip travel.

6. Apparatus for treating rapidly moving strip and the like comprising means for continuously feeding the strip material in a path, a floating frame surrounding the path of strip travel on the exit side of the feeding means, rotary eccentric means causing the top and bottom of the frame to move in identical spaced apart circles on opposite sides of the path of strip travel, drive means simultaneously driving the feeding means and the eccentric means, a first member fixed on the frame adjacent the path of strip travel to operate in a circular path a portion of which lies substantially in the first mentioned path, a second member movable reciprocably in guides in the frame on the opposite side of the path of strip travel from the first member and transverse to the path of strip travel and connecting means holding the second member spaced from and independent of the eccentric means, said connecting means causing the second member to move in the guide means generally in the direction of the first mentioned path as the frame rotates to bring the strip between the first and second members.

7. Apparatus for treating rapidly moving strip and the like comprising means for continuously feeding the strip material in a path, a floating frame surrounding the path of strip travel on the exit side of the feeding means, spaced rotary cam means acting on the frame to cause it to move in a circle whose radius is the length of throw of the eccentric, drive means simultaneously driving the feeding means and the cam means, a first member fixed to said frame on one side of the path of strip travel, guide means on the frame on the side opposite the path of strip travel from the first member and transverse to the path of strip travel, a second member movable in said guide means, connecting means holding the second member spaced adjacent the path of strip travel whereby the second member reciprocably follows a path generally parallel to the path of strip travel, said connecting means being pivoted on second eccentric cam means spaced from the path of strip travel and means for rotating said second eccentric cams within the connecting means to vary the pivotal axis of the connecting means whereby the second member is moved into and out of position to intersect the path of strip travel.

8. Apparatus for treating rapidly moving strip and the like comprising continuously operable means feeding strip and the like in a path, means varying the speed of said feeding means, a first member for acting on the strip and the like mounted to operate in a circular path, a portion of which lies substantially in the first mentioned path, means varying the radius of said circular path whereby to maintain the circumferential speed of the member at substantially the linear speed of the strip, a guide extending generally transversely of the first mentioned path mounted to move with the first member, a second member for acting on the strip and the like mounted to reciprocate in the guide and link means connecting the second member to a pivot point spaced from and independent of the first member causing the second member to reciprocate in the guide and move generally reciprocably in the direction of the first mentioned path generally in unison with the first member and to move substantially into the first mentioned path substantially simultaneously with the first member.

9. Apparatus for treating rapidly moving strip and the like comprising means for feeding strip material, an eccentrically driven floating frame surrounding the path of strip travel on the exit side of the feeder means all points of which frame move in a circle, a first member on the frame on one side of the path of strip travel, a second member for acting on the strip reciprocably movable in said frame transverse to the path of the strip, link means connecting the second member to a pivot point spaced from and independent of the first member causing the second member to reciprocate and move generally reciprocably in the direction of the path of strip travel simultaneously with the first member, drive means driving the eccentrically driven floating frame, means varying the radius of the frame circle to vary the circumferential speed of the frame and variable drive means connecting said first drive means with the feeding means whereby variations in the speed of the frame may be matched with the speed of feed.

10. Apparatus for treating rapidly moving strip and the like comprising means for feeding strip material, an eccentrically driven floating frame surrounding the path of travel on the exit side of the feeder and mounted to operate in a circular path, means for varying the eccentricity of the floating frame drive, a first member on the frame on one side of the path of strip travel, a second member for acting on the strip reciprocably movable in said frame transverse to the path of the strip, link means connecting the second member to a pivot point spaced from and independent of the first member causing the second member to reciprocate and move generally reciprocably in the path of strip travel simultaneously with the first member, drive means driving the strip feed means and the eccentric drive at a constant relative rate of linear speed.

11. Apparatus for treating rapidly moving strip and the like comprising means for continuously feeding the strip material, a floating frame surrounding the path of strip travel on the exit side of the feeding means, variable throw eccentric cam means rotating the floating frame so that all points thereon describe a circle whose radius is the length of throw of the eccentric drive, variable drive means simultaneously driving the feeding means and the eccentric cam means at equal linear speeds, a first member fixed on the frame adjacent the path of strip travel, a second member movable in guides in the frame on the opposite side of the path of strip travel and transversely thereto and connecting means holding the second member spaced from and independent of the eccentric cam means, said connecting means causing the second member to move in the guide means as the frame rotates generally reciprocably in the direction of strip travel whereby to bring the strip between the first and second members.

12. Apparatus for treating rapidly moving strip and the like comprising continuously operable means feeding strip and the like in a path, a first member for acting on the strip and the like mounted to operate in a circular path a portion of which lies substantially in the first mentioned path, a guide extending generally transversely of the first mentioned path mounted to move with the first member, a second member for acting on the strip mounted to reciprocate in the guide and move generally reciprocably in the direction of the first mentioned path in unison with the first member, removable treating means on the first and second members, and locking means holding said treating means on said members.

13. In an apparatus for treating rapidly moving strip following a path of travel, a first member for acting on the strip and the like mounted to operate in a circular path a portion of which lies substantially in the path of strip travel, a guide extending generally transversely of the path of strip travel to move with the first member, a second member for acting on the strip and the like mounted to reciprocate in the guide and link means connecting the second member to a pivot point spaced from and independent of the first member causing the second member to reciprocate in the guide and move generally reciprocably in unison with the first member generally in the direction of strip travel substantially simultaneously with the first member.

14. In an apparatus for treating rapidly moving strip following a path of travel, a first member for acting on the strip and the like mounted to operate in a circular path, a portion of which lies substantially in the path of strip travel, a guide extending generally transversely of the path of strip travel to move with the first member, a second member for acting on the strip and the like mounted to reciprocate in the guide, link means connecting the second member to a pivot point spaced from and independent of the first member causing the second member to reciprocate in the guide and move generally in unison with the first member generally reciprocably in the direction of strip travel substantially simultaneously with the first member and cam means carrying the pivot point spaced from the path of strip travel and means selectively changing the cam means to move the pivot point toward and away from the path of the strip travel whereby the distance between the said first and second members is selectively varied to control the intersection of the second member with the path of strip travel.

15. In an apparatus for treating rapidly moving strip following a path of travel, a first member for acting on the strip and the like mounted to operate in a circular path a portion of which lies substantially in the path of strip travel, means for varying the radius of said circular path, a guide extending generally transversely of the path of strip travel to move with the first member, a second member for acting on the strip and the like mounted to reciprocate in the guide and link means connecting the second member to a pivot point spaced from and independent of the first member causing the second member to reciprocate in the guide and move generally reciprocably in unison with the first member generally in the direction of strip travel substantially simultaneously with the first member.

*16. In an apparatus for treating rapidly moving strip following a path of travel, a first member for acting on the strip and the like mounted to operate in a circular path, a portion of which lies substantially in the path of strip travel, a guide extending generally transversely of the path of strip travel to move with the first member, a second member for acting on the strip and the like mounted to reciprocate in the guide, link means connecting the second member to a pivot point spaced from and independent of the first member causing the second member to reciprocate in the guide and move generally in unison with the first member generally reciprocably in the direction of strip travel substantially simultaneously with the first member, means carrying the pivot point spaced from the path of strip travel and means acting on the pivot carrying means selectively changing the position of said pivot carrying means to move the second member toward and away from the path of strip travel whereby the distance between the said first and second members is selectively varied to control the intersection of the second member with the path of strip travel.*

*17. In an apparatus for treating rapidly moving strip following a path of travel, a first member for acting on the strip and the like mounted to operate in a circular path, a portion of which lies substantially in the path of strip travel, a guide extending generally transversely of the path of strip travel to move with the first member, a second member for acting on the strip and the like mounted to reciprocate in the guide, link means connecting the second member to a pivot point spaced from and independent of the first member causing the second member to reciprocate in the guide and move generally in unison with the first member generally reciprocably in the direction of strip travel substantially simultaneously with the first member, means carrying the pivot point spaced from the path of strip travel and means acting on the pivot carrying means selectively changing said pivot carrying means from a first position in which the second member intersects the path of strip travel to a second position in which the second member is held out of the path of strip travel.*

References Cited in the file of this patent or the original patent

UNITED STATES PATENTS

| | | |
|---|---|---|
| 846,362 | Swift | Mar. 5, 1907 |
| 1,601,128 | McFarland | Sept. 28, 1926 |
| 1,807,499 | Trump | May 26, 1931 |
| 1,814,513 | Johnson | July 14, 1931 |
| 1,831,167 | Gangler | Nov. 10, 1931 |
| 1,939,140 | Schreck | Dec. 12, 1933 |
| 2,032,098 | Roberts | Feb. 25, 1936 |
| 2,112,850 | Klinger | Apr. 5, 1938 |
| 2,136,210 | Hall | Nov. 8, 1938 |
| 2,261,007 | Talbot | Oct. 28, 1941 |
| 2,368,152 | McWilliams | Jan. 30, 1945 |
| 2,640,539 | Piper | June 2, 1953 |
| 2,734,570 | Hallden | Feb. 14, 1956 |

FOREIGN PATENTS

| | | |
|---|---|---|
| 348,900 | Great Britain | May 21, 1951 |